United States Patent [19]

Perani

[11] Patent Number: 5,711,997
[45] Date of Patent: Jan. 27, 1998

[54] SEMIFLUID MIX AND ASSOCIATED ENVIRONMENTAL RESTORATION METHOD

[75] Inventor: Piero Alberto Bruno Perani, Vertova, Italy

[73] Assignee: Limestone di Perani Piero Alberto Bruno, Casnigo, Italy

[21] Appl. No.: 625,444

[22] Filed: Mar. 28, 1996

[30] Foreign Application Priority Data

Apr. 5, 1995 [IT] Italy ................... MI95A0686

[51] Int. Cl.⁶ ............... B05D 1/36; C04B 16/02
[52] U.S. Cl. ............. 427/403; 106/719; 106/720; 106/731; 106/863; 106/805; 106/811; 106/900; 111/900; 405/258; 405/266; 427/421; 427/427
[58] Field of Search ................. 106/731, 719, 106/803, 805, 811, 720, 900; 427/403, 421, 427; 111/900; 405/258, 266

[56] References Cited

U.S. PATENT DOCUMENTS

| | | | |
|---|---|---|---|
| 3,938,279 | 2/1976 | Fonne | 47/9 |
| 3,980,485 | 9/1976 | Edwards | 106/708 |
| 4,304,069 | 12/1981 | Kobayashi | 47/58 |
| 4,369,054 | 1/1983 | Shinholster | 71/25 |

FOREIGN PATENT DOCUMENTS 811224  6/1974  Belgium .

OTHER PUBLICATIONS

Database WPI—Derwent Publications Ltd., London, GB, AN 95-325696—XP002008507 & JP-A-07 224 280 (Seibutsu Kankyo System) *abstract* (Aug. 1995).
Database WPI—Derwent Publications Ltd., London, GB, AN 93-121629—XP002008508 & JP-A-05 059 362 (Kyoto S) *abstract* (Mar. 1993).
Abstract of Japanese Patent No. 05-287751 (Nov. 1993).
Abstract of Japanese Patent No. 59-91230 (May 1984).
Chemical Abstract No. 80:94612, which is an abstract of an article found in a journal entitled: Nippon Sochi Gakkai–Shi (1973), 19(3), pp. 269–275.
Derwent Abstract No. 79-41641B, which is an abstract of Japanese Patent Specification No. 54-051207 (Apr. 1979).
Derwent Abstract No. 95-250655, which is an abstract of Japanese Patent Specification No. 7-155055 (Jun. 1995).

*Primary Examiner*—Anthony Green
*Attorney, Agent, or Firm*—Guido Modiano; Albert Josif; Daniel J. O'Byrne

[57] ABSTRACT

A semifluid mix for environmental reclamation, comprising peat, a hydraulic binder, resins, seeds, lime, and manure, the mix being particularly adapted to restore a covering of vegetation on surfaces that have suffered environmental degradation, such as ski pistes, road slopes, landslide and quarry faces. The present invention furthermore relates to a method for preparing the mix and to a method for applying the semifluid mix on the surfaces that have suffered environmental degradation.

10 Claims, No Drawings

SEMIFLUID MIX AND ASSOCIATED ENVIRONMENTAL RESTORATION METHOD

BACKGROUND OF THE INVENTION

The present invention relates to a semifluid mix and to the associated environmental restoration method.

In particular, the present invention relates to a semifluid mix for restoring areas that have undergone environmental degradation, to the associated preparation method, and to the method for applying said mix on the degraded surfaces, in order to create and/or restore a layer of vegetation that is missing or insufficient due to artificial or natural causes.

Surfaces subjected to environmental degradation actions, due both to natural phenomena such as landslips, landslides, avalanches, and to human activities such as the formation of quarries, ski pistes, road slopes, are becoming increasingly widespread. These surfaces are often devoid of vegetation, covered with non-cohesive, unsettled material which constitutes a threat to the stability of the land. The vulnerability of these environments is furthermore increased by the fact that they are often located in regions having a considerable slope and with a detrital matrix of the soil.

Accordingly, it becomes considerably important to have materials or methods adapted to restore both a landscaping appearance that is as uniform as possible with respect to the environment surrounding the degraded region, and the humus layer, which is so important for stability and for the ecological equilibrium of the various ecosystems.

Currently, there are a few methods for restoring degraded environmental regions; these methods entail the use of artificial soil, mats of artificial fiber, various cultivation methods, or even particular coating paints.

Among conventional environmental restoration methods, the hydroseeding method is often used; it entails preparing a water-based mix with seeds, acrylic resins, and chemical fertilizers. This semifluid mix is then sprayed with pumps without the aid of compressed air.

The use of particular vegetable coverings based on straw or geotextile material is also known, these coverings being spread along the slopes to be replanted, fixing them with nails.

The use of so-called "neroverde" is also known, i.e. a method that entails the application of loose straw along degraded slopes, associated seeding, the application of an emulsion of bitumen (fluid tar and water), and associated fixing by means of metal nets that are anchored to the surfaces by appropriate nails.

These conventional methods are not free from having drawbacks, including difficulty in working on very steep slopes, such as for example on the faces of quarries, together with difficulty in permanently fixing the supporting material (coverings, nets, mats, etcetera) for the substrate to be seeded.

In particular, in the case of hydroseeding, an adapted supporting organic substrate is missing, so that due to the drying of the resins that are present, or due to the washout action of water, a considerable reduction in grass covering occurs, with a reduction of even 90% in the yield of the grass layer.

Furthermore, conventional methods seldom ensure durability of the grass sod in the medium and long term, since it is not possible to disregard the presence of an adequate organic substrate.

SUMMARY OF THE INVENTION

The general aim of the present invention is to avoid or substantially reduce the drawbacks described above.

One of the objects of the present invention is to provide a semifluid mix for environmental reclamation that consolidates the treated surface and at the same time restores its grass sod.

Another object is to provide a semifluid mix which, once applied along degraded surfaces, hardens and thus allows both to slow the erosive and washout action of rainwater and to prevent drying of the treated regions.

Another object is to provide a method for preparing a semifluid mix for environmental reclamation that is simple to perform.

Another object is to provide a semifluid mix and a method for replanting sandy regions such as pre-desert and desert regions, forming a grass sod that limits wind erosion, or to plant arid regions to provide golf greens.

Another object is to provide a method for applying a semifluid mix on surfaces affected by environmental degradation that is simple to prepare and does not require the use of systems for anchoring the plant layer.

In view of this aim, these objects, and others which will become apparent hereinafter, a semifluid mix for environmental reclamation, comprising cement, peat, a resin, and water is provided according to the invention.

The resins used in the mix according to the invention are hydrophilic resins and have the main characteristic of absorbing a large amount of water, so as to constitute a reserve water store that can be used by the plants.

Said hydrophilic resins are advantageously selected from the group consisting of alkyl($C_1$–$C_6$)cellulose resins, acrylic resins, vinyl resins, and mixtures thereof. Said resins are preferably included in the mix according to the invention, in an amount between 0.01 and 5% by weight, more preferably between 1 and 2% by weight. Among alkyl($C_1$–$C_6$)cellulose resins, methyl cellulose is preferred.

These resins are capable of absorbing large amounts of water and therefore allow to constitute a reserve that can be used by the seeds that are present in the mix during dry periods. The presence of the resins furthermore allows to reduce water runoff during rainfall.

The use of methyl cellulose resins is advantageous because, owing to their vegetable origin, they do not constitute a pollutant for the area to be treated.

Examples of resin include the resin marketed under the name FWM IIS (produced by Hoechst Italia, Milan, Italy), the Mowilith resin (produced by the Casella company, Italy), resin M 5S38 (produced by Ecoteck), resin A 15C49 by Ecoteck, and the Glutolin resin by Hoechst.

Said cement acts as a hydraulic binder and is advantageously selected from the group consisting of the types known as Portland (e.g. Portland 325), pozzolana cement, and blast furnace cement, and is preferably present in an amount between 3 and 60% by weight, more preferably between 15 and 40% by weight with respect to the other components of the mix.

The cement that is included performs the dual function of acting as a filler and of increasing the pH of the mix, providing a habitat that is favorable for plant development.

The cement also has a neutral behavior with respect to the other components that are present in the mix according to the invention, particularly with respect to fertilizers. Cement is, for example, preferred over lime because lime acts with the fertilizers that include nitrate or phosphate salts, producing lime phosphates and nitrates and releasing an excess of ammonia that is harmful for the development of plants.

Preferably, water is provided in an amount between 5 and 65% by weight, more preferably between 10 and 25% by weight. These amounts of water allow to provide a semifluid mass adapted for use in a conventional spray system of the type for spraying cement on.

Cement reacts in the presence of water according to a well-known reaction, according to timings and manners that are known to those skilled in the art.

It has been observed that by mixing cement with the peat and with the water, a semifluid mix forms which tends to harden, thus producing a spongy mass having a porous consistency and particularly adapted to optionally contain seeds inside its cavities.

The peat used in the present invention is of a known type (sphagnum peat) for example "Novabait" or "Humax" peat, and is advantageously present in an amount between 10 and 60% by weight, more preferably between 15 and 40% by weight. The peat has the dual function of providing nutrients for the seeds included in the mix and of giving consistency to the final mix.

Since said peat has a pH of approximately 3 to 4, which accordingly is not an optimum value for the development of a vegetation layer, a compound adapted to raise the pH value, so as to ensure a natural habitat for the development of a grass sod, is advantageously included in the mix. Said compound is preferably chosen among alkaline or alkaline-earth metals and mixtures thereof and is more preferably constituted by calcium hydroxide, preferably in the form of hydrated lime, which is easily available at a low cost.

The semifluid mix according to the present invention furthermore advantageously comprises plant seeds belonging to the Gramineae family, preferably selected from the group consisting of species Lolium, Festuca, Cynodon, Poa, Agrostis, and mixtures thereof, or to shrubs having a more developed root system, preferably of the species Rubinia, Rosa, Hedera, Betulla, Carpinus, Ligustrum, and mixtures thereof.

By way of example, mention is made of Lilium perenne, red fescue, sheep fescue, Cynodon dactylon, Poa pratensis, Agrostis tenuis, Agrostis palustris, and mixtures thereof among seeds that are useful to produce a grass layer.

Said mix furthermore preferably comprises compounds based on plant fibers such as for example straw, wood fibers, chipwood, cotton fibers, which are adapted to complete the supporting function, which is mainly performed by the peat and by the hydraulic binder. Preferably, these compounds based on plant fibers are selected from the group consisting of straw and manure and mixtures thereof, manure being the most preferred one because it also acts as a natural fertilizer. The function performed by these components based on plant fibers is mainly that of being binders and supporting agents, by virtue of the mesh of fibers that forms during the mixing of the mix according to the invention.

According to another aspect, the semifluid mix according to the invention includes the humid residue of municipal waste, constituted by degraded organic products originating essentially from the rejects of the material recovered with separate municipal waste collection.

Advantageously, said mix furthermore comprises fertilizers adapted to facilitate prompt seed germination. Said fertilizers are advantageously selected from the group consisting of nitrogen-based and phosphor-based compounds. Among nitrogen-based compounds, preference is given to salts of ammonium, for example ammonium sulfate, and of nitric acid, for example calcium nitrate, ammonium nitrate; among phosphor-based compounds, preference is given to salts of phosphoric acid, such as for example calcium phosphate, ammonium phosphate, and normal-superphosphate. Diammonium phosphate and ammonium sulphate are particularly preferred, since they allow quick germination of the seeds even in the presence of unfavorable environmental and weather conditions.

The mix according to the invention tends to harden, with times and manners that depend mainly on the percentage and type of the cement being included, producing a product that has a spongy structure and in which the binder, together with the plant fibers, mainly performs a supporting function for the remaining components.

The method for hardening the mix, caused by the reaction of the cement with the water, is associated with a simultaneous setting effect that allows adhesion of the mix to the surfaces whereon it is applied. Once the hardening process has ended, the product that has formed has a porous structure, with cavities inside which the seeds and the resins, swollen with water, are contained. The particular structure of this product allows the seeds to germinate, facilitated by the presence of a reserve of water embedded in the resins. Furthermore, the presence of the manure allows to ensure that the buds receive the nutrients that are essential for the development of the plant, at the same time limiting the risks of environmental pollution.

The present invention furthermore relates to the method for preparing the semifluid mix described above, said method comprising the mixing of peat with water, a resin, and cement.

Advantageously, the method according to the invention entails the addition of 3 to 60% by weight, with respect to the final mix, of said hydraulic binder; 10 to 60% by weight of said peat; 0.01 to 5% by weight of said resin; and 5 to 65% by weight of said water.

According to an embodiment of the method according to the invention, there is provided an initial step for mixing the peat with water in a conventional mixing means such as for example a cement mixer, in order to prepare an initial mix having a fluid consistency.

A hydrophilic resin of the previously described type is then added, and mixing is performed so as to allow the resin to include the water. The cement is then added in dry or hydrated from.

The resulting mixture has a semifluid consistency and is subjected to further mixing, so as to uniformly amalgamate the components.

Preferably, said cement is of a conventional type, such as for example pozzolana cement, blast furnace cement, or Portland cement, which are easily commercially available.

The method according to the invention advantageously comprises an additional step that entails including and mixing compounds based on plant fibers, such as for example straw, manure, cotton fibers, chipwood, and fertilizers.

Preferably, said compounds with plant fibers are manure, use whereof allows to minimize the use of chemical fertilizers.

Advantageously, there is provided a further step that entails including an alkaline or alkaline-earth hydroxide in the mixture resulting from the previous steps. Preferably, said hydroxide is hydrated lime.

One of the preferred embodiments of the method according to the invention furthermore entails a step for adding seeds to the semifluid mix. Said step can be provided, as an alternative, when the semifluid mix has already been applied to the surfaces to be restored. In this case, a mixture constituted by water, resins of the above described type, and seeds is sprayed by conventional seed dispersing means.

Advantageously, said seeds are chosen in the Gramineae family, among short-stalk shrubs.

Another embodiment of the method for preparing the mix according to the invention entails the separate preparation of a resin-based mixture comprising methyl cellulose resin in an amount preferably between 60 and 90% by weight, more preferably between 75 and 85% by weight, and vinyl resin in an amount that is preferably between 40 and 10% by weight, more preferably between 25 and 15% by weight.

Water is added to the resin-based mixture, in an amount that is advantageously close to resin saturation. This amount varies according to the composition of the resin-based mixture and is generally between 10 and 50 times the weight of said mixture.

In a subsequent step, the fertilizer ammonium sulfate is added to the mixture in an amount preferably equal to 45–80% by weight, more preferably in an amount between 60 and 70% by weight, relative to the weight of the initial resin-based mix. The mixture is allowed to decant and a gelatinous mass is separated from an aqueous phase after approximately 10 minutes.

The gelatinous mass includes substantially all the added ammonium sulfate. This gelatinous mass is then included and mixed with the other components of the mix according to the invention.

It has been surprisingly found that the inclusion of said resin-based gelatinous mass allows strong adhesion of the mix according to the invention to the surfaces to be treated, in addition to acting as a water reserve and as a fertilizer for the seeds that are present in the mix. Furthermore, even when it is in a highly dehydrated state, it is capable of regenerating, by reabsorbing water.

According to another aspect, the present invention provides a method for environmental restoration or modification which comprises the application of the above-described semifluid mix on surfaces to be planted, in a layer of preferably 0.3 to 10 cm, more preferably 1 to 3 cm.

The present method is particularly advantageous in the environmental restoration of quarry faces, such as limestone and marl quarries, and to provide a plant covering for dry and sandy regions, such as desert and pre-desert areas or to prepare golf greens.

According to a preferred embodiment of the method according to the invention, during a first step a semifluid mix is prepared which comprises pozzolana cement, manure, straw and/or peat, a fertilizer, and water, according to amounts and methods described earlier.

The mix is mixed by virtue of mixing means and applied by spraying, by virtue of conventional spraying means, on the surfaces to be treated.

In a second step, a second mix is prepared which includes peat, preferably in an amount between 30 and 60% by weight, a cement, preferably in an amount between 5 and 40%, and a resin of the above described type, preferably in an amount between 0.5 and 2% by weight, mixed with water. The water is advantageously included in an amount between 5 and 65% by weight of water, more preferably 15 to 10% by weight.

The method advantageously provides for the application of said second mix in such an amount as to form a second layer of 0.5 to 2 cm that is superimposed on the first layer. The two superimposed layers limit the migration of the moisture present at ground level and allow to effectively insulate from the heat of the sun the lower layers in which the seeds are located, facilitating the development of vegetation.

After being mixed in a conventional mixing means, the semifluid mix is preferably pumped by a conventional pump (for example the Spritzebon Model 215 pump by Italmacchine) along a pipe, generating a pressurized jet that is directed onto the surfaces to be restored.

Preferably, said jet is directed by using a conventional gun (for example Midec 2" gun manufactured by Spritzebon).

As an alternative, the semifluid mix is transferred, by conventional transfer means, to another tank, wherefrom it is subsequently pumped along a pipe advantageously provided with a gun.

In a preferred embodiment, the head of the pump pipe has a nozzle adapted to mix said mixture with compressed air produced by a conventional air compressor (for example the model XA545 manufactured by Atlas Copco), adapted to generate a jet having a pressure of up to 12 bar at the outlet.

The environmental restoration method according to the invention can be applied to areas that have been damaged due both to natural causes, such as landslides, avalanches, landslips, and to artificial causes, such as the formation of ski pistes, road slopes, concrete structures, and the excavation of quarries.

In the containment of landslides, the semifluid mix according to the invention finds an application that is adapted to produce a layer with low permeability that prevents the infiltration of rainwater, limiting the sliding of surface masses and the associated landslip.

The semifluid mix according to the invention can furthermore be used in restoring mountain surfaces, along which the construction of skiing facilities has produced levelings and the reshaping of surfaces, causing considerable excavations and embankments. At the end of these operations, damaged areas without vegetation, covered with pebbly and unsettled material, remain on the site.

The restoration method according to the present invention finds a further application in the treatment of road slopes made of pebbly or rocky material and of concrete structures for the containment or protection of civil structures, which are difficult to conceal.

The use of the semifluid mix according to the present invention is particularly advantageous in the environmental restoration of quarries, allowing to restore a plant layer adapted to conceal the landscape disruption caused by the excavations.

The following examples are provided merely by way of illustration of the present invention and must not be understood as limiting the scope of said invention, as defined in the appended claims.

EXAMPLE 1

Semifluid mix for restoring quarries.

The mix is produced by mixing the following components in a cement mixer:

| | |
|---|---|
| Peat | 700 kg |
| Quick-setting cement | 240 kg |
| Methyl cellulose resin | 2.5 kg |
| Water | 150 kg |

The mixture is applied on the surfaces of the quarry, providing a layer approximately 0.5 to 1 cm thick, which reaches high hardening levels in approximately 15 minutes.

EXAMPLE 2

Semifluid mix composed of

| | |
|---|---|
| Peat | 500 kg |
| Cement | 240 kg |
| Methyl cellulose resin | 2 kg |
| Lime | 60 kg |
| Seeds of grass for lawns | 6 kg |
| Manure | 600 kg |
| Diammonium phosphate | 4 kg |

The components are mixed so as to allow their uniform dispersion in the semifluid mix and are applied on a dry region to provide a layer approximately 2 cm thick, which allows the growth of a grass layer adapted for golf greens.

EXAMPLE 3

Production of a ready-for-use semifluid mix 50 kg of peat, 60 kg of manure, 24 kg of cement, 6 kg of lime, 0.2 kg of cellulose resin, 0.4 kg of diammonium phosphate were mixed and 0.5 kg of Gramineae seeds were dispersed in the semifluid mix. 120 l of water were added, so as to prepare a mix that is fluid enough to be sprayed on the walls of the quarry to be restored, by means of a cement gun of the Spritzebon type. Once the mix has been sprayed, it tends to set quickly and to adhere along the walls of the quarry, forming a dark, spongy layer. The surface of the layer is pitted, with several cavities inside which the seeds are seated. The plants that grow therefore find ideal conditions for taking and developing a root system adapted to support their stalk.

As an alternative, the above-mentioned mix was prepared without including the seeds. The mix was sprayed along the face of the quarry, then allowing the mixture to harden and form a layer thick enough to allow the development of vegetation. A further mixture was then prepared; it was constituted by 20 l of water, 0.1 kg of vinyl resin, and 0.5 kg of Gramineae seeds, and spraying was performed along the entire quarry face that had already been treated. The sprayed seeds were mostly deposited in the cavities and after approximately eight days they produced a layer of vegetation that covered the treated surface.

The mix thus obtained, once sprayed along the face of the quarries, tends to harden quickly and to generate, in little more than a week, a layer of vegetation such as to uniformly cover most of the reclaimed surface. The development of vegetation is observed when a layer of mix of at least 3 mm is applied.

EXAMPLE 4

A method for preparing the semifluid mix in two steps and use thereof to restore a degraded area.

The amounts stated are useful for applying a double layer 1 to 1.5 cm thick over a surface of approximately 200 sq m.
Step 1

150 kg of Portland cement, 1 m³ of fermented manure (equivalent to 900 kg), 50 kg of a mix of straw and peat, 10 kg of multi-nutrient fertilizer (mixture of normal-superphosphate, ammonia, ammonium phosphate, ammonium sulfate, potassium chloride, phosphoric acid, and sulfuric acid), 1 kg of type A 15C49 hydrophilic resin (produced by Ecotek, Italy), 250 kg of water are mixed in a conventional cement mixer. Once a uniform mixture of the components has been obtained, the semifluid mix is pumped into a flexible duct that is rigidly coupled to an articulated supporting structure, directing the jet towards the surface to be treated, which is constituted for example by a rock face. The amount of product that is sprayed is adjusted so as to provide a 0.5 cm thick layer.
Step 2

900 l of peat (approximately 150 kg), 50 kg of Portland cement, 3 kg of diammonium phosphate, 2 kg of ammonium nitrate, 5 kg of compound fertilizer of the 12/12/12 type, 8 kg of seeds constituted by a mixture of Lolium perenne, red fescue, sheep rescue, Cynodon dactylon, Poa pratensis, Agrostis tenuis (to provide 15/50 g per sq m of surface), 0.5 kg of type M 5S38 resin (Ecotek), and 400 l of water are mixed in the same machine used for Stage 1.

After mixing, a semifluid mix is formed which is applied in the manner described for the previous step, superimposing a second layer of 0.5–1 cm on the first layer.

EXAMPLE 5

Preparation of a resin-based mixture for the semifluid mix according to the invention.

330 g of Glutolin (resin-based mixture produced by Hoechst Italia, based on methyl cellulose and vinyl resin) were mixed with 500 g of water so as to form a tacky mass having the consistency of a gelatin. Then 200 g of ammonium sulfate were added and mixing was performed for 10 minutes. By leaving the resin-based mixture to settle, a clear liquid phase separated from a gelatinous phase.

The two phases were separated and the resin-based gelatinous mass was mixed with 65 kg of peat, 21 kg of pozzolana cement, and 0.5 kg of a mixture of seeds of Lolium, Festuca, Cynodon, Hedera, and Ligustrum, adding another 10 kg of water to make the resulting mix liquid enough to be applied by spraying on a sloping and dry hilly surface.

The mix adhered to the treated surfaces, and an hour after its application it reached such a consistency that it could not be washed away even in case of a storm.

What is claimed is:

1. A method for environmental restoration, wherein a semifluid mixture consisting essentially of 10 to 60% by weight of peat, 5 to 65% by weight of water, 3 to 60% by weight of cement, and 0.01 to 5% by weight of a hydrophilic resin is sprayed directly onto surfaces which have suffered environmental degradation, to give a layer having a porous structure.

2. A method according to claim 1, wherein said hydrophilic resin is selected from the group consisting of acrylic, vinyl, alkyl($C_1$–$C_6$) cellulose resins and mixtures thereof.

3. A method according to claim 1, wherein said surfaces that have suffered environmental degradation are quarry faces.

4. A method according to claim 1, wherein said surfaces that have suffered environmental degradation are vertical surfaces.

5. A method according to claim 1, wherein said layer having a porous structure has a thickness of 0.3 to 10 cm.

6. A method for environmental restoration, including the steps of:

spraying a semifluid mixture consisting essentially of 10 to 60% by weight of peat, 5 to 65% by weight of water, 3 to 60% by weight of cement, and 0.01 to 5% by weight of a hydrophilic resin, directly onto surfaces that have suffered environmental degradation, to give a layer having a porous structure, and spraying onto said layer a water-based mixture including 30 to 60% by weight of peat, 5 to 40% by weight of cement, 0.5 to 2% by weight of a hydrophilic resin, 5 to 65% by weight of water and plant seeds in an amount effective to give a vegetative layer.

7. Method according to claim 6, wherein said hydrophilic resin is selected from the group consisting of acrylic, vinyl, alkyl($C_1$–$C_6$) cellulose resins and mixtures thereof.

8. Method according to claim 6, wherein said surfaces that have suffered environmental degradation are quarry faces.

9. Method according to claim 6, wherein said surfaces that have suffered environmental degradation are vertical surfaces.

10. Method according to claim 6, wherein said layer has a thickness of 0.3 to 10 cm.

* * * * *